(12) United States Patent
Huber

(10) Patent No.: US 6,287,044 B1
(45) Date of Patent: *Sep. 11, 2001

(54) FITTING

(75) Inventor: Edgar Huber, Hard (AT)

(73) Assignee: Julius Blum Gesellschaft m.b.H., Hochst (AT)

( * ) Notice: Subject to any disclaimer, the term of this patent is extended or adjusted under 35 U.S.C. 154(b) by 0 days.

This patent is subject to a terminal disclaimer.

(21) Appl. No.: 09/476,136

(22) Filed: Jan. 3, 2000

(30) Foreign Application Priority Data

Jan. 5, 1999 (AT) .......................................... 10/99

(51) Int. Cl.$^7$ .................................................. F16B 13/06
(52) U.S. Cl. .................................. 403/297; 403/DIG. 12; 411/55; 411/80.6
(58) Field of Search ..................................... 403/230, 231, 403/409.1, 297, DIG. 12, 408.1; 411/26, 44, 55, 43, 45, 57.1, 80.5, 80.6, 80.1, 104

(56) References Cited

U.S. PATENT DOCUMENTS

| | | | |
|---|---|---|---|
| 2,255,650 | * | 9/1941 | Burke ........................................ 411/44 |
| 3,486,158 | * | 12/1969 | Soltysik et al. ...................... 411/44 X |
| 4,147,444 | * | 4/1979 | Herb et al. ........................ 403/297 X |
| 4,657,458 | * | 4/1987 | Woller et al. ........................... 411/182 |
| 4,673,320 | * | 6/1987 | Froehlich ............................. 411/45 X |
| 5,246,323 | * | 9/1993 | Vernet et al. ....................... 411/55 X |
| 5,378,097 | * | 1/1995 | Barnavol .............................. 411/55 X |
| 5,664,901 | * | 9/1997 | Mayr ...................................... 403/297 |
| 5,993,129 | * | 11/1999 | Sato ..................................... 411/80.6 |

FOREIGN PATENT DOCUMENTS

| | | |
|---|---|---|
| 4438408A1 | 5/1996 | (DE) . |
| 195 05 311 | 8/1996 | (DE) . |
| 0171745 | 2/1986 | (EP) . |
| 0400535 | 12/1990 | (EP) . |
| 0 691 478 | 1/1996 | (EP) . |
| 0950819A2 | 10/1999 | (EP) . |
| 2182995 | 5/1997 | (GB) . |
| 99/24723 | 5/1999 | (WO) . |

\* cited by examiner

Primary Examiner—Harry C. Kim
(74) Attorney, Agent, or Firm—Wenderoth, Lind & Ponack, L.L.P.

(57) ABSTRACT

A fitting to be detachably fastened to a furniture part includes a fitting body to abut the furniture part, at least one dowel-like expansion sleeve which is anchored to the fitting body and which can be inserted into a drilled hole of the furniture part, and a pin shaped expansion member for expanding the expansion sleeve. The expansion sleeve projects through an opening in the fitting body, and the expansion sleeve also projects through the opening in the fitting body. The expansion sleeve is provided with at least one flap that projects in a radial direction from the expansion sleeve. The expansion member is provided with a head, which, when the fitting is mounted, presses the flap onto the side of the fitting body which faces away from the furniture part.

23 Claims, 5 Drawing Sheets

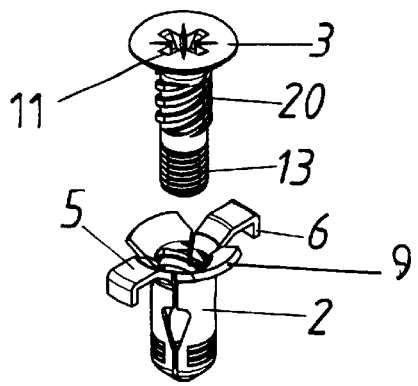
Fig. 1
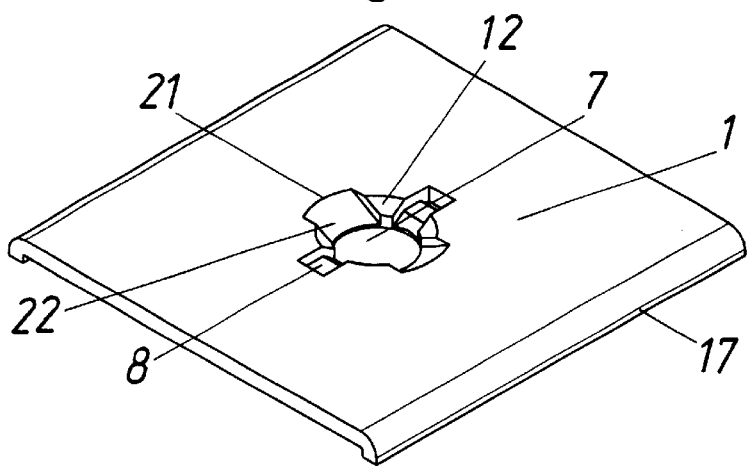
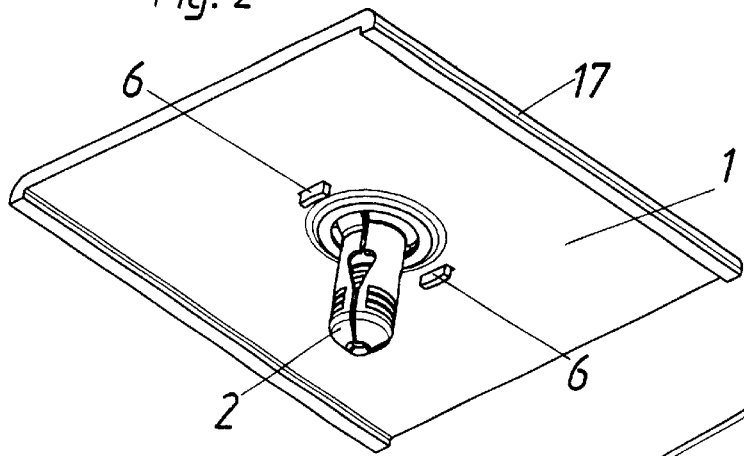
Fig. 2
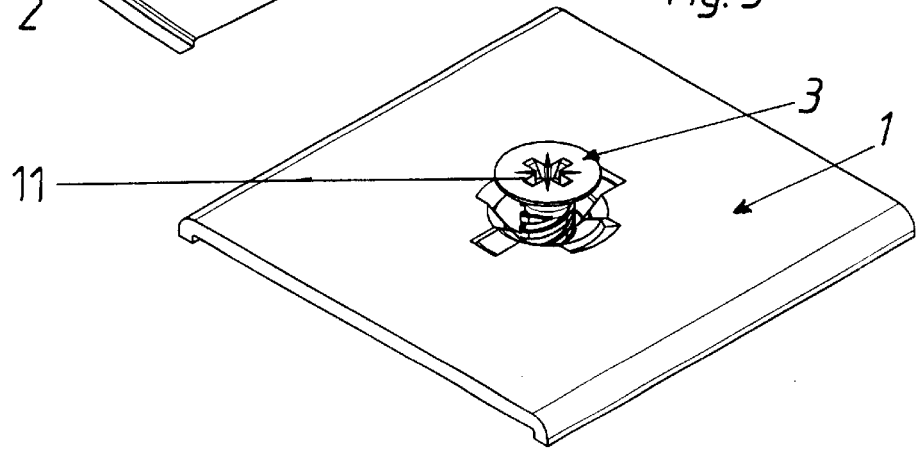
Fig. 3

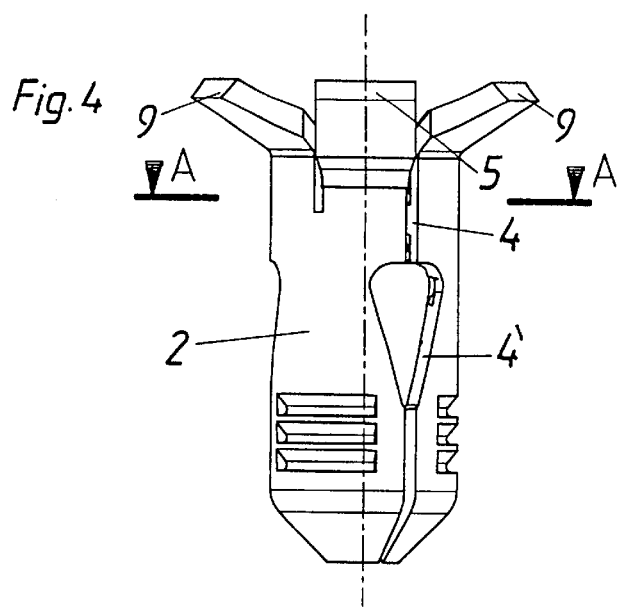
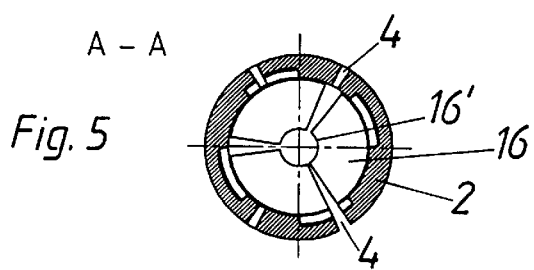
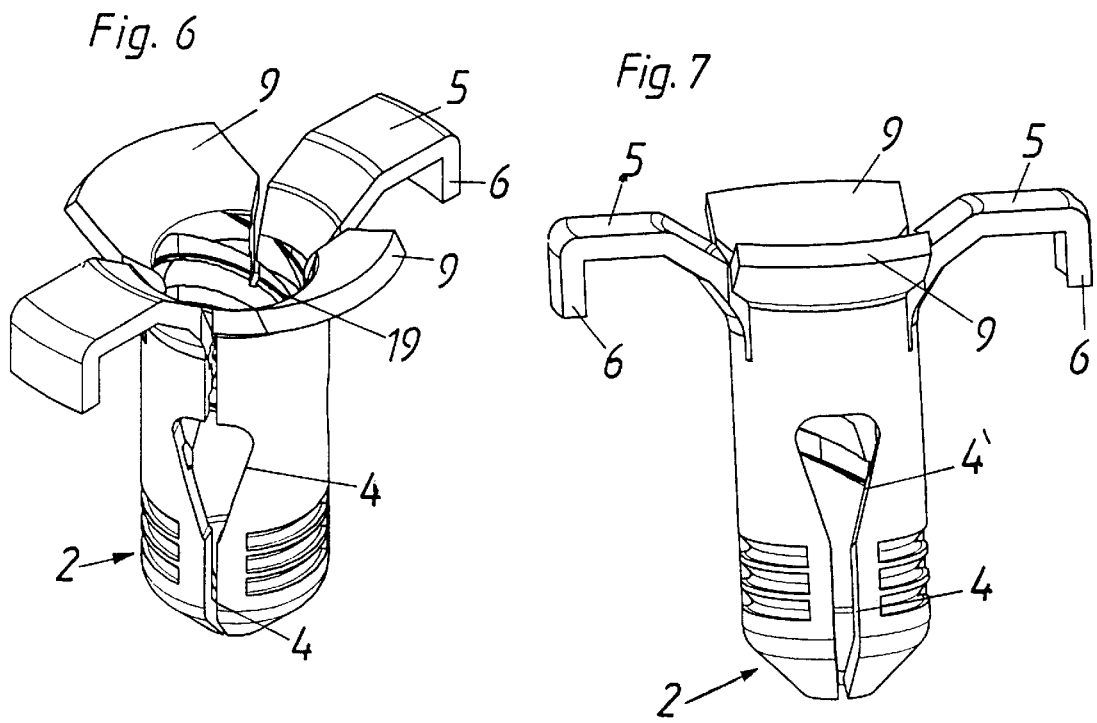

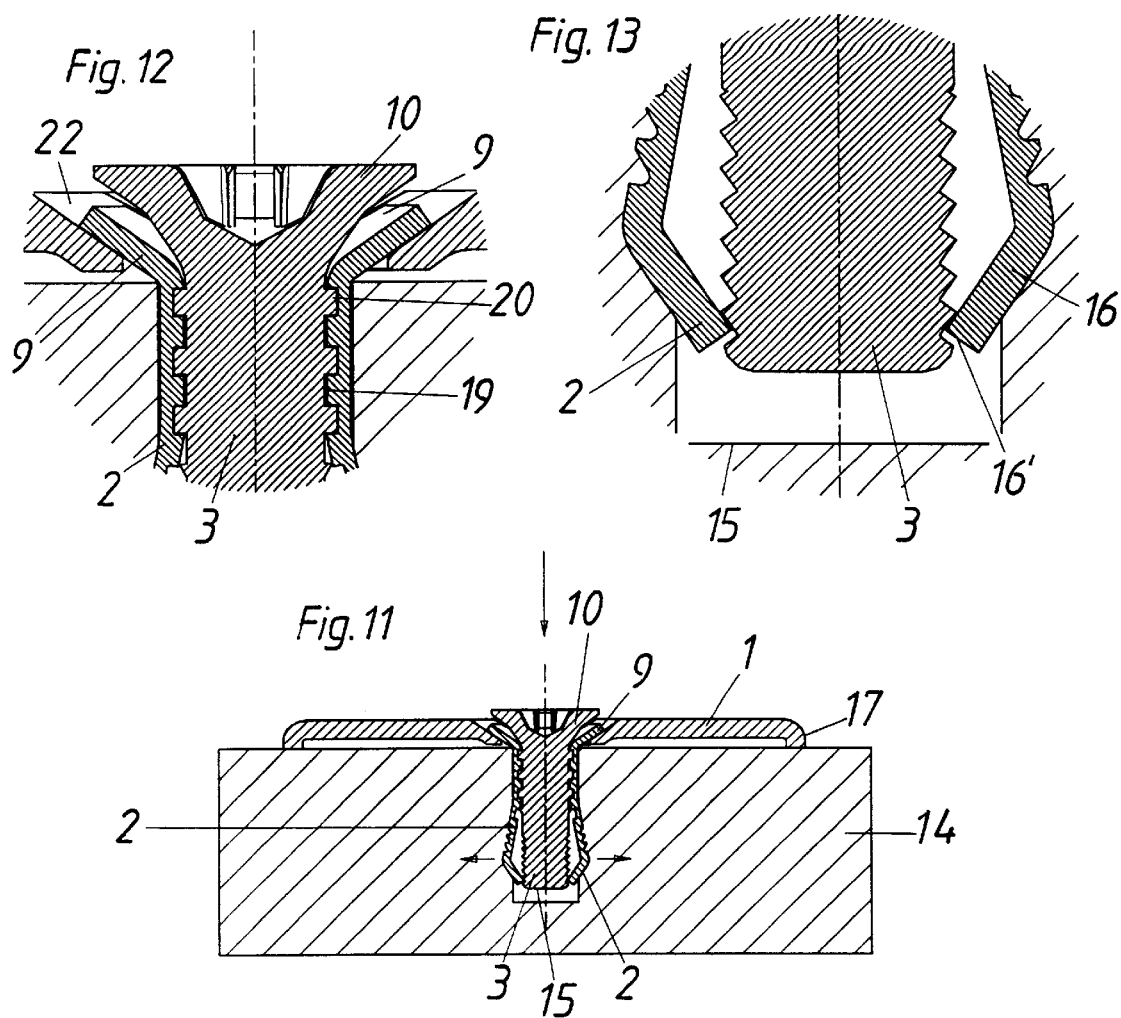

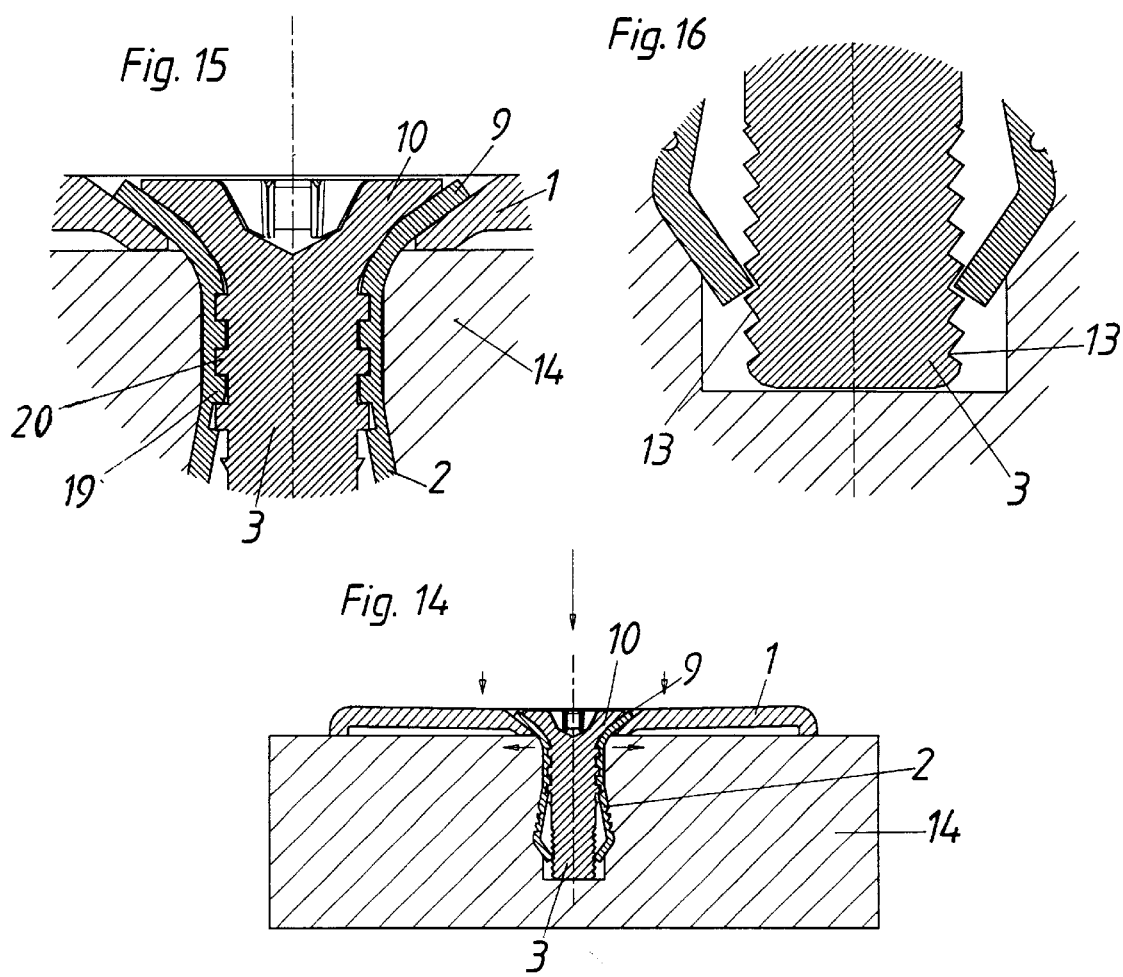

FITTING

BACKGROUND OF THE INVENTION

The invention relates to a fitting to be detachably fastened to a furniture part with a fitting body which is to abut the furniture part. At least one dowel-like expansion sleeve is anchored to the fitting body and can be inserted into a drilled hole of the furniture part, and a pin shaped expansion member for expanding the expansion sleeve projects through an opening in the fitting body.

SUMMARY OF THE INVENTION

It is the object of the present invention to provide an improved fitting which can be mounted on a piece of furniture, and the piece of furniture has bores for holding the fitting wherein the bores have a very small diameter.

According to the invention, this is achieved because the expansion sleeve also projects through an opening in the fitting body and is provided with at least one flap projecting sideways from the expansion sleeve. The expansion member is provided with a head, which, when the fitting is mounted, presses the flap onto the side of the fitting body which is to face away from the furniture part.

In a preferred embodiment of the invention, the expansion sleeve is provided with two flaps which are diagonally opposed to each other. Preferably, the two flaps are inclined with respect to a longitudinal axis of the expansion sleeve.

When the expansion member is tightened, its head presses on the flaps of the expansion sleeve and the flaps are pushed on to the fitting body. If a force acts on the fitting body urging the fitting body away from the piece of furniture, the fitting body struts against the flaps and is thereby anchored directly to the expansion sleeve. The expansion sleeve itself is held in the piece of furniture. In a conventional fitting having no such flaps, the fitting body is held by the head of the expansion member. The expansion member could be easily moved out of the expansion sleeve, especially if the expansion member is provided with a non-locking thread which is screwed into a thread in the expansion member. Such a non-locking thread with a high pitch would be necessary to make rapid mounting and removal of the fitting possible.

In a preferred embodiment, the expansion member is provided with two threads having different pitches, and one of the threads is self-locking. Advantageously, the expansion sleeve is provided with a female thread, and one of the threads of the expansion member engages the female thread.

The fitting body, the expansion sleeve and the expansion member are assembled before they are mounted on the piece of furniture as a unit. The expansion member will not be fully inserted into the expansion sleeve, and the expansion sleeve comprises at least two expansion legs having ends which project away from the fitting body. the end of each expansion legs has an angled portion that projects towards a central axis of the expansion sleeve in the form of a cone and engages one of the threads of the expansion member. When the expansion member is fully inserted into the expansion sleeve so that its head abuts the flaps of the expansion sleeve, the fitting is rigidly fastened to the piece of furniture.

In a further embodiment of the invention, the expansion sleeve is provided with arms which are bent to abut the side of the fitting body which is to be further away from the furniture part. The arms each have ends which protrude through holes in the fitting body. Preferably, the ends are riveted to the fitting body.

BRIEF DESCRIPTION OF THE DRAWINGS

The invention will now be described in more detail by way of example only with reference to the accompanying drawings, wherein:

FIG. 1 is an exploded perspective view of an embodiment of the fitting;

FIG. 2 is a perspective view of the fitting, wherein the side of the fitting which abuts the piece of furniture in the mounted position is shown;

FIG. 3 is a perspective view of the fitting wherein the side of the fitting which faxes away from the piece of furniture in the mounted position is shown;

FIG. 4 is a side view of the expansion sleeve;

FIG. 5 is a section taken along line A—A of FIG. 4;

FIGS. 6 and 7 are perspective views of the expansion sleeve;

FIG. 11 is a section taken along line A—A of FIG. 8 wherein the expansion member is shown in a locked position in which the fitting is attached to the piece of furniture;

FIGS. 12 and 13 each show a detail of FIG. 11;

FIG. 14 is a section taken along line A—A of FIG. 8 wherein the expansion member and the expansion sleeve are shown in the locked position in which the fitting is attached to the piece of furniture; and FIGS. 15 and 16 each show a detail of FIG. 14.

DESCRIPTION OF THE PREFERRED EMBODIMENTS

Figure 10:
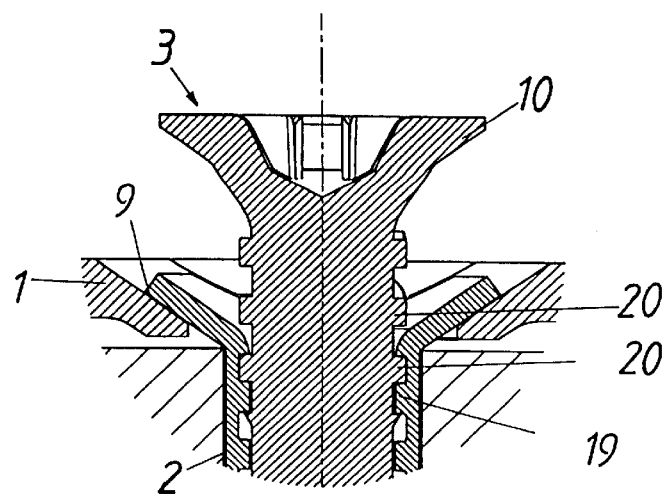
FIG. 10 shows a detail of FIG. 9.

In the embodiments shown, the fitting according to the invention comprises a fitting body 1 in the form of a plate which, for example, could be a mounting plate for a hinge arm, an expansion sleeve 2, and a pin-shaped expansion member 3.

The expansion sleeve 2 and the expansion member 3 are preferably made of tempered or hardened steel. The expansion sleeve 2 can be provided with a phosphat coating.

The thickness of the wall of the expansion sleeve 2 is less than a millimeter, preferably within 0.7 and 0.8 millimeter.

The expansion sleeve 2 includes a head portion and a substantially cylindrical body portion. In the embodiment shown, the body portion of the expansion sleeve 2 is provided with four longitudinal slots 4 which form expansion legs 16, and one of the slots 4 is open at both ends. Two of the slots 4 have triangular extensions 4' approximately in the middle of the expansion sleeve 2. The triangular extensions 4' improve the bendability of the legs of the expansion sleeve 2, which are defined by the slots.

The head portion of the expansion sleeve 2 has two arms 5 extending radially from the expansion sleeve 2 and having bent ends 6. The fitting body 1 is provided with an opening 7 into which the expansion sleeve 2 can be inserted. Further, the fitting body 1 is provided with a first set of recesses 8 which, when the expansion sleeve 2 is mounted in the fitting body, accommodate the arms 5 of the expansion sleeve 2. At the ends of each of the first set of recesses 8, slots are provided through which the bent off ends 6 of the arms 5 extend. After the expansion sleeve 2 is inserted into the fitting body 1, the ends 6 are riveted to the fitting body 1.

The head portion of the expansion sleeve 2 is further provided with two flaps 9 which extend outwardly in a radial direction and which are, like the arms 5, provided at the rear end of the expansion sleeve 2. These flaps 9 will extend at an angle from the expansion sleeve 2. The fitting body 1 is provided with a second set of recesses 21 adjoining the opening 7 in which, when the fitting is mounted, the flaps 9 of the expansion sleeve 2 are situated.

The expansion member 3 is in the form of a metal pin. The expansion member 3 is provided with a head 10 having a hold 11 for a tool, for example a screw driver. In the embodiments shown, the head 10, is a flat head but could also be an oval head.

When in the mounted position, the head 10 is situated within a recess 12 of the fitting body 1 and presses the flaps 9 onto the slant planes 22 of the second set of recesses 21. As a consequence, the head 10 presses part of the fitting body 1 which borders on the expansion sleeve 2 towards the furniture part.

Figure 9:
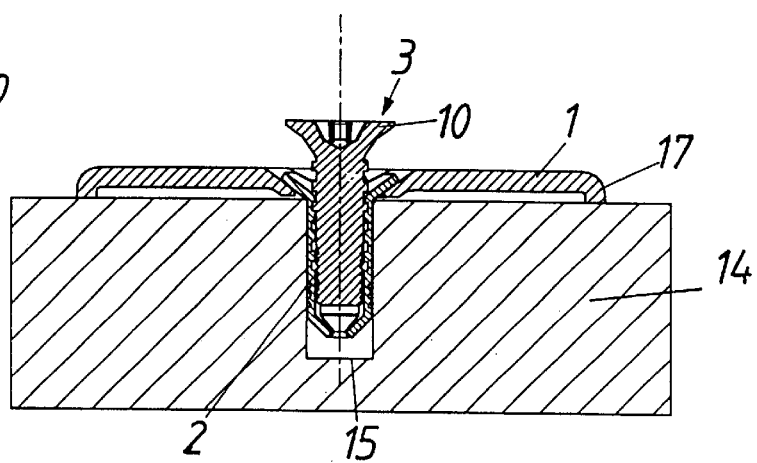
FIG. 9 is a section taken along line A—A of FIG. 8, wherein the expansion member is shown in an unlocked position in which the fitting is still removable from the piece of furniture.
Figure 8:
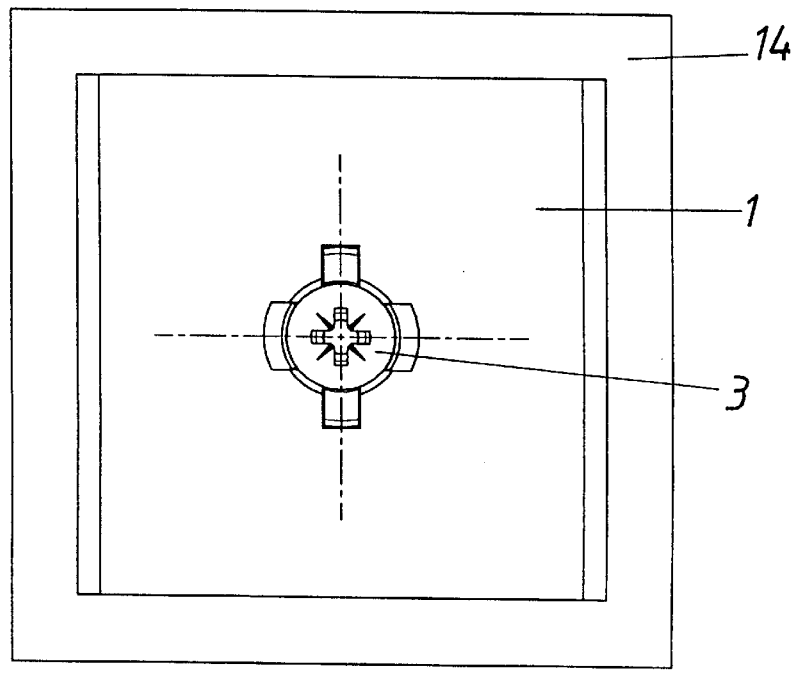
FIG. 8 is a plan view of the fitting.

The expansion member 3 is provided with two threads 13, 20. Before the fitting body 1 is mounted in the furniture part 14 (for example, a furniture side wall) the expansion member 3 is inserted into the expansion sleeve 2 so that it is held in the expansion sleeve 2 but so that the expansion legs 16 of the expansion sleeve 2 are not forced apart. In this way, the unit consisting of the fitting body 1, the expansion sleeve 2 and the expansion member 3 can be mounted on the furniture part 14, the expansion sleeve 2 and the expansion member 3 being inserted into a hole 15. This arrangement is shown in FIG. 9.

To fasten the fitting body 1 to the furniture part 14, the expansion member 3 is moved further into the expansion sleeve 2 and into the hole 15 so that the head 10 of the expansion member 3 is positioned within the recess 12 of the fitting body 1. The front end of the expansion member 3 extends out of the expansion sleeve 2 and into the hole 15, and the angled portion 16' of each of the expansion legs 16 is pushed outward so that the expansion legs 16 of the expansion sleeve 2 are pressed onto the wall of the hole 15.

The angled portion 10' of each expansion leg 16 of the expansion sleeve 2 engages the thread 13 of the expansion member 3. The angled portion 16' are oblique corresponding to the pitch of the thread 13 of the expansion member 3. If the fitting body 1 is to be removed from the furniture part 14, the expansion member 3 can be screwed out of the expansion sleeve 2 by a screw driver.

As the angled portion 16' of the expansion sleeve 2 engage the thread 13, the expansion member 3 is screwed out of the expansion sleeve 2, and the angled portion 16' substitutes for a female thread. When the head 10 of the expansion member 3 is at a distance from the fitting body 1, the expansion member 3 can be pulled out of the expansion sleeve 2 with a pair of pliers. In some cases the stress of the expansion legs 16 of the expansion sleeve 2 will be sufficient to push the expansion member 3 out of the expansion sleeve 2.

The expansion member 2 is provided with two threads 13, 20 whereby the thread 13 is a locking thread and the thread 20 is a non-locking thread. In other words, the thread 20 has a steeper pitch.

The expansion sleeve 2 is provided with a female thread 19 in which the thread 20 of the expansion member 3 is screwed. Both threads 19, 20 are rectangular in section. Because the pitches of the threads 19, 20 are very steep, the expansion member 3 can be screwed into the expansion sleeve 2 very rapidly.

After the expansion member 3 is screwed into the expansion sleeve 2, the flaps 9 of the expansion sleeve 2 are pressed onto the slant planes 22 of the recesses 21 and the flaps 9 press the fitting body 1 towards the furniture side wall 14.

The fitting body 1, which is made of steel, is provided with a rim 17 protruding from the fitting body 1 and abutting the furniture part 14, and the fitting body 1 is prestressed.

What is claimed is:

1. A fitting to be detachably fastened to a furniture part, comprising:

a fitting body having a first surface to abut a furniture part and having a second surface to face away from the furniture part;

an expansion sleeve anchored to said fitting body by projecting through a hole in said fitting body, said expansion sleeve including a head portion and a substantially cylindrical body portion to be inserted into a hole in the furniture part, said head portion including at least one flap projecting in a radial direction with respect to a central axis of said expansion sleeve; and a pin-shaped expansion member for insertion into said expansion sleeve so as to move said expansion sleeve between a non-locking position and an expanded locking position, said expansion member having a head for pressing said at least one flap of said head portion of said expansion sleeve against said second surface of said fitting body when said expansion member is inserted into said expansion sleeve.

2. The fitting of claim 1, wherein said head portion of said expansion sleeve includes two flaps projecting in opposite radial directions with respect to said central axis of said expansion sleeve.

3. The fitting of claim 2, wherein each of said flaps are inclined with respect to said central axis of said expansion sleeve.

4. The fitting of claim 1, wherein said head of said expansion member comprises a flat head.

5. The fitting of claim 1, wherein said expansion member includes a male thread.

6. The fitting of claim 5, wherein said male thread comprises a first thread, said expansion member further including a second thread having a different pitch than said first thread.

7. The fitting of claim 6, wherein one of said first thread and said second thread comprises a self-locking thread.

8. The fitting of claim 1, wherein said expansion sleeve includes a slot extending from a first end of said expansion sleeve to a second end of said expansion sleeve parallel to said central axis of said expansion sleeve.

9. The fitting of claim 8, wherein said slot includes sidewalls spaced apart, wherein said sidewalls at a middle portion of said slot with respect to said central axis of said expansion sleeve are space apart at a greater distance than at end portions of said slot so as to form a recess at said middle portion.

10. The fitting of claim 9, wherein said recess has a triangular shape.

11. The fitting of claim 1, wherein said fitting body includes at least one recess, said at least one flap of said head portion of said expansion sleeve being arranged within said at least one recess.

12. The fitting of claim 11, wherein each of said at least one recess of said fitting body includes an inclined bottom surface, said at least one flap of said head portion being pressed against said inclined bottom surface of said at least one recess when said expansion member is inserted into said expansion sleeve.

13. The fitting of claim 12, wherein said body portion of said expansion sleeve has a female thread, and said expansion member has a male thread for engaging said female thread of said expansion sleeve.

14. The fitting of claim 1, wherein said body portion of said expansion sleeve includes at least two expansion legs, each of said expansion legs having an angled portion at a front end of said expansion leg opposite said fitting body, said angled portion of each of said expansion legs projecting toward said central axis of said expansion sleeve; and said expansion member having a male thread for engaging said angled portion of each of said expansion legs when said at least one expansion sleeve is in said expanded locking position.

15. The fitting of claim 1, wherein said fitting body is elastically deformable at a position whereat said flaps are to be pressed against said fitting body.

16. The fitting of claim 1, wherein said expansion sleeve has arms extending in a radial direction with respect to said central axis of said expansion sleeve and being arranged so as to abut said second surface of said fitting body, each of said arms having a bent end extending through a hole in said fitting body.

17. The fitting of claim 16, wherein said bent end of each of said arms is riveted into said fitting body.

18. The fitting of claim 16, wherein said fitting body has recesses, said arms of said expansion sleeve being arranged within said recesses.

19. The fitting of claim 1, wherein said expansion sleeve is formed of tempered steel.

20. The fitting of claim 1, wherein said expansion sleeve is formed of hardened steel.

21. The fitting of claim 1, wherein said expansion member is formed of tempered steel.

22. The fitting of claim 1, wherein said expansion member is formed of hardened steel.

23. The fitting of claim 1, wherein said fitting body, said expansion sleeve, and said expansion member are arranged such that said head of said expansion member contacts said at least one flap of said expansion sleeve when said expansion sleeve is in said expanded locking position.

* * * * *